United States Patent
Rijskamp et al.

(10) Patent No.: US 7,823,501 B2
(45) Date of Patent: Nov. 2, 2010

(54) BEVERAGE SUPPLYING DEVICE HAVING A DRIP TRAY COMPRISING A CONVEX DROPLET LANDING SURFACE

(75) Inventors: Peter Rijskamp, Hoogeveen (NL); Gael Louis Jacques Prat-Pfister, Amersfoort (NL)

(73) Assignee: Koninklijke Philips Electronics N.V., Eindhoven (NL)

( * ) Notice: Subject to any disclaimer, the term of this patent is extended or adjusted under 35 U.S.C. 154(b) by 420 days.

(21) Appl. No.: 11/577,447

(22) PCT Filed: Oct. 10, 2005

(86) PCT No.: PCT/IB2005/053318
§ 371 (c)(1), (2), (4) Date: Apr. 18, 2007

(87) PCT Pub. No.: WO2006/043194
PCT Pub. Date: Apr. 27, 2006

(65) Prior Publication Data
US 2008/0087172 A1    Apr. 17, 2008

(30) Foreign Application Priority Data
Oct. 18, 2004    (EP) .................................. 04105113

(51) Int. Cl.
    *A47J 31/057*    (2006.01)
(52) U.S. Cl. ................ 99/304; 99/308; 99/305
(58) Field of Classification Search ........... 99/279–323, 99/495, 444–450, 400, 401, 511–513, 275–277
See application file for complete search history.

(56) References Cited

U.S. PATENT DOCUMENTS

| | | | | |
|---|---|---|---|---|
| 4,382,402 A | * | 5/1983 | Alvarez | 99/295 |
| 4,471,689 A | * | 9/1984 | Piana | 99/295 |
| 4,484,515 A | * | 11/1984 | Illy | 99/282 |
| 4,551,611 A | * | 11/1985 | Longo | 392/451 |
| 4,653,390 A | * | 3/1987 | Hayes | 99/281 |
| 4,724,752 A | * | 2/1988 | Aliesch et al. | 99/289 R |
| 4,738,378 A | * | 4/1988 | Oakley et al. | 222/82 |
| 7,328,651 B2 | * | 2/2008 | Halliday et al. | 99/295 |

FOREIGN PATENT DOCUMENTS
EP        585607       3/1994

\* cited by examiner

*Primary Examiner*—Thor S Campbell

(57) ABSTRACT

A coffee maker with a drip tray (9) which serves for receiving coffee droplets falling from an outlet member of the coffee maker when a path between the outlet member and the drip tray (9) is free from interruptions such as a coffee cup. The drip tray (9) comprises a tray portion (91) and a cover (92) in which a convex droplet landing surface (93) for receiving droplets falling from the outlet member of the coffee maker is arranged. A coffee droplet dropping on this surface (93) breaks apart, gently flows off this surface (93), and is discharged to the tray portion (91) through a hole (95) arranged in the cover (92). In this way, a situation in which coffee splashes out of the tray portion (91) as a result of the direct impact of a coffee droplet is avoided, and the cleanliness of the coffee maker is enhanced.

9 Claims, 2 Drawing Sheets

BEVERAGE SUPPLYING DEVICE HAVING A DRIP TRAY COMPRISING A CONVEX DROPLET LANDING SURFACE

The present invention relates to a beverage supplying device comprising a drip tray. The present invention also relates to a drip tray for such a beverage supplying device.

A well-known example of a beverage supplying device is a coffee maker, which is used for making coffee from water and extractable material comprising ground coffee beans. The coffee maker comprises an outlet member for letting out freshly brewed coffee. When the coffee maker is in operation, a user of the coffee maker is supposed to place a coffee container such as a cup, a mug, a coffee pot, or the like under the outlet member, so that the coffee may be received in this container. In some coffee makers, the outlet member has two outlet openings, so that the coffee maker can be used for making two cups of coffee at a time.

Situations may occur in which the user unintentionally positions the coffee container incorrectly with respect to the outlet member, or uses a container that is too small, or even completely forgets to place a container under the outlet member. For this reason a drip tray capable of receiving and containing spilled coffee is located under the outlet member. The drip tray is also needed in view of the fact that coffee may drip from the outlet member after the coffee maker has been operated and the coffee container has been removed. Due to the presence of the drip tray, the coffee maker and the vicinity of the coffee maker are prevented from getting polluted by spilled coffee to a large extent.

In many cases, the drip tray comprises a tray portion and a cover for covering the tray portion, which cover comprises holes for letting through the coffee. This cover may at the same time serve as a support for supporting the coffee container, but it is also possible that a separate support located above the drip tray is provided.

In a practical embodiment of a coffee maker having an outlet member in which two outlet openings are arranged, the cover of the drip tray comprises two holes for allowing spilled coffee to pass through to the tray portion of the drip tray, which holes are located in a straight line under the outlet openings. However, it is found that a top surface of the cover of the drip tray gets stained by coffee droplets in such an embodiment. Moreover, parts of the coffee maker located in the vicinity of the cover of the drip tray get stained as well. This is especially unpleasant if the coffee maker has a light color.

The undesirable phenomenon described in the preceding paragraph is a result of the fact that, in a situation in which there is already some coffee present in the drip tray, the impact of coffee droplets dropping from the outlet member into this quantity of coffee causes coffee to splash out of the drip tray, through the holes in the cover, whereupon the coffee thus expelled will land on any area of the top surface of the cover or on any part of the coffee maker located in the vicinity of the cover.

It is an object of the present invention to offer a solution to the problem sketched above of the top surface of the cover of the drip tray and parts of the coffee maker located in the vicinity of the cover getting polluted by coffee splashing out of the drip tray. This object is achieved by a beverage supplying device comprising a beverage outlet member and a drip tray, the drip tray comprising a droplet landing surface for receiving droplets of beverage issuing from the outlet member, which droplet landing surface is located at a higher level than a bottom of the drip tray.

According to the present invention, a droplet landing surface is provided, which is located at a higher level than a bottom of the drip tray. In order for the droplet landing surface to be effective, the location of the droplet landing surface is adapted to the location of the outlet opening(s) of the outlet member of the beverage supplying device, such that a beverage droplet dropping from the outlet member will indeed land on the droplet landing surface.

In a coffee maker according to the present invention, a coffee droplet heading for the drip tray lands on the convex droplet landing surface, breaks apart, and gently flows off the droplet landing surface in a direction towards the bottom of the drip tray. This prevents the coffee droplet from impacting directly on the bottom of the drip tray, or, if the drip tray already contains a quantity of coffee, on a surface of the quantity of coffee. Consequently, a situation in which coffee splashes out of the drip tray is avoided, as a result of which the coffee maker remains clean.

Preferably, a shape of the droplet landing surface deviates from a shape of a surface extending in a substantially horizontal plane, so that a situation in which a coffee droplet landing on the droplet landing surface bounces off the surface again does not occur. In a preferred embodiment, the droplet landing surface has a convex shape. It is also possible that the droplet landing surface has a concave shape, or at least comprises concave portions. In general, a coffee droplet will not bounce off a surface which is sloping with respect to the horizontal, but will remain on such a surface and will start to flow along the sloping surface under the influence of gravity.

In a preferred embodiment, the droplet landing surface is shaped as a top surface of an elevated portion of the bottom of the drip tray. In another preferred embodiment, the drip tray comprises a cover, and a convex droplet landing surface is integrated in the cover. In such an embodiment, the droplet landing surface may be shaped as at least a portion of a top surface of a cover portion, which cover portion is preferably surrounded by an annular hole, said hole being only interrupted by at least one connecting member for connecting this cover portion to the rest of the cover.

The present invention will now be explained in greater detail with reference to the Figures, in which similar parts are indicated by the same reference signs, and in which.

Figure 1:
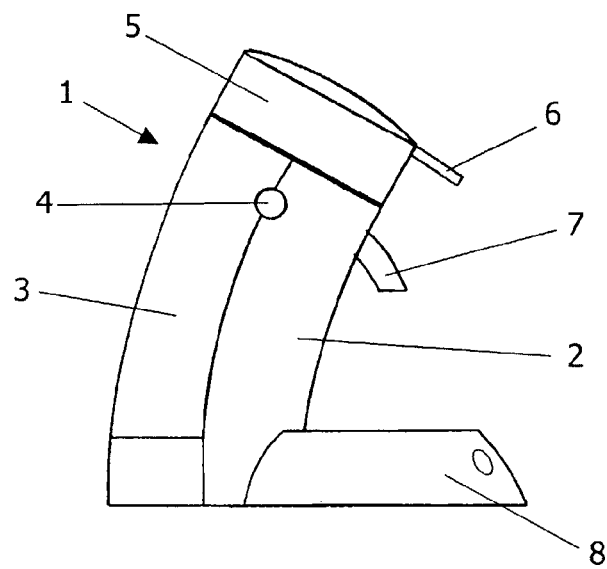
FIG. 1 is a side elevation of a coffee maker according to a first preferred embodiment of the present invention.

FIG. 1 shows a coffee maker 1 according to a first preferred embodiment of the present invention. The coffee maker 1 comprises a body 2 for accommodating various components (not shown) which play a role in the process of brewing coffee, for example a boiler for heating water, a brew chamber having a space for accommodating a coffee pad, i.e. an envelope filled with a quantity of ground coffee beans, tubes for transporting water, and a pump for forcing water to flow through the coffee maker 1.

At a rear side of the body 2, a water tank 3 is arranged, which is clipped to the body 2 by means of two clips 4, one of which is shown in the side view of FIG. 1. The water tank 3 is detachably connected to the body 2 by means of the clips 4, so that the user is capable of removing the water tank 3 from the coffee maker 1 and bringing the water tank 3 to a tap or the like in order to fill it with water. In this way, there is no need for moving the entire coffee maker 1 when it is necessary to add water.

A cover member 5 is arranged on top of the body 2 and the water tank 3. The cover member 5 is movable between a closed position and an open position. FIG. 1 shows the closed position of the cover member 5. When being moved from the one position to the other, the cover member 5 pivots about a pivot (not shown) at a rear side of the coffee maker 1, so that a space accessible from the front of the coffee maker 1 is obtained in the open position of the cover member 5. When the cover member 5 is in the open position, a user of the coffee maker 1 is capable of putting at least one coffee pad in place or removing used coffee pads from the coffee maker 1. The closed position of the cover member 5 is associated with an operative state of the coffee maker 1, in which the coffee maker 1 is capable of carrying out a coffee making process. A locking mechanism (not shown) is provided, which is operated by a lever 6 arranged at a top side of the cover member 5, for locking the cover member 5 in the closed position. The lever 6 also constitutes a handgrip which facilitates handling of the cover member 5.

The coffee maker 1 comprises an outlet member 7 for delivering coffee, which member projects from the body 2. In the coffee maker 1 as shown, the outlet member 7 comprises two outlet openings (not shown) for letting out the coffee.

At a bottom side, the coffee maker 1 comprises a foot 8 which has a circular circumference. The positions of the foot 8 and the outlet member 7 are mutually adapted such that the outlet openings of the outlet member 7 are approximately perpendicularly above a central portion of the foot 8.

The coffee maker 1 as shown is designed so as to be capable of delivering a single quantity of coffee, associated with one cup, or a double quantity of coffee, associated with two cups. When a user of the coffee maker 1 operates the coffee maker 1 to make a single quantity of coffee, he needs to place a cup (not shown) on top of the foot 8, taking care to put the cup in a proper position for receiving coffee from both outlet openings of the outlet member 7. When the user operates the coffee maker 1 to make a double quantity of coffee, he may choose to use a single cup which is large enough for receiving the double quantity of coffee, or to use two cups. If he chooses to use two cups, he needs to take care that each of the two cups is correctly positioned below an outlet opening of the outlet member 7, so that each cup is sure to receive coffee from one respective outlet opening.

Figure 2:
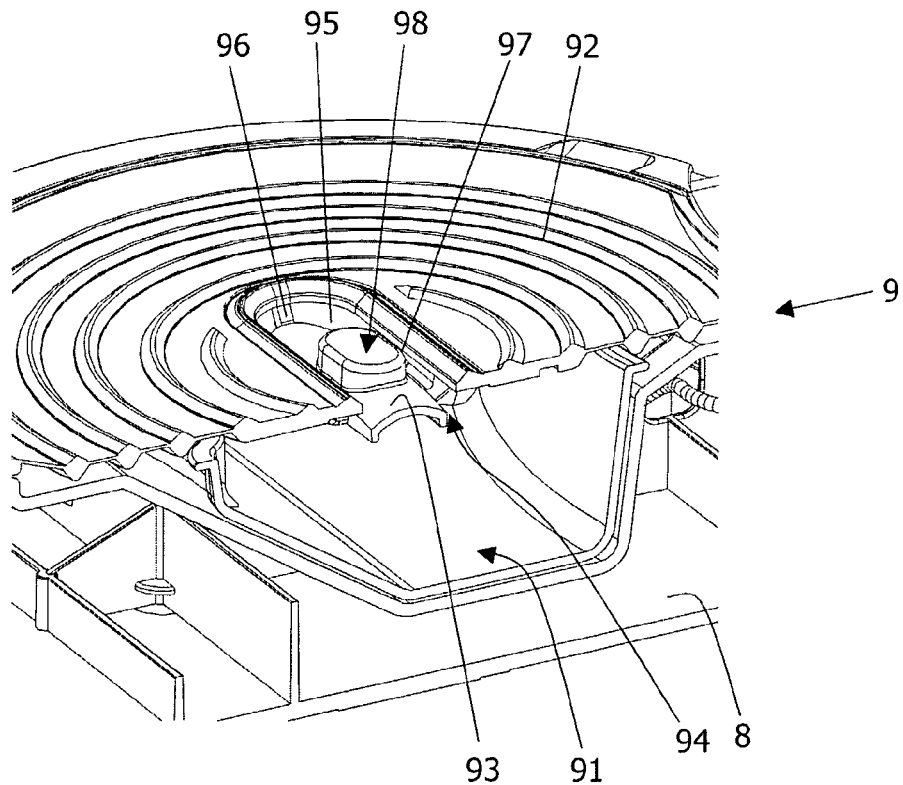
FIG. 2 is a perspective view of a cross-section of a foot of the coffee maker shown in FIG. 1.

A drip tray 9 is arranged in the foot 8, which is shown in FIG. 2. The main function of the drip tray 9 is to receive coffee delivered by the outlet member 7 in any situation in which there is no barrier (cup) between the outlet member 7 and the foot 8. If the user operates the coffee maker 1 to make coffee and, for example, forgets to place one or two cups on the foot 8, the quantity of coffee delivered by the coffee maker 1 will be received by the drip tray 9. Furthermore, the drip tray 9 is needed for receiving droplets of coffee released by the outlet openings after the desired quantity of coffee has been delivered.

The drip tray 9 comprises a tray portion 91 for containing the received coffee and a cover 92 for covering a top side of the tray portion 91. The cover 92 also functions as a support for the cup(s). Both the tray portion 91 and the cover 92 are removably arranged in the foot 8, so that it is easy for a user to empty the tray portion 91 and to clean the tray portion 91 and the cover 92.

According to the state of the art, two holes are arranged in the cover 92, which are positioned in a straight line below the outlet openings, so that coffee droplets falling from the outlet member 7 reach the tray portion 91 of the drip tray 9 without being hampered by the cover 92. According to the present invention, however, a droplet landing surface 93 is provided for receiving coffee droplets falling from the outlet member 7. The droplet landing surface 93 is integrated in the cover 92 and is positioned perpendicularly below the outlet openings. In particular, the droplet landing surface 93 is shaped as a portion of a top surface of a central cover portion 94. In the example shown, the droplet landing surface 93 is recessed with respect to a top surface of the rest of the cover 92.

A narrow annular hole 95 is arranged around the central cover portion 94, which hole 95 is only interrupted by connecting members 96 for connecting the central cover portion 94 to the rest of the cover 92. The coffee droplets thus do not drop directly into the tray portion 91 of the drip tray 9 in the coffee maker 1 according to the present invention, but drop on the droplet landing surface 93 first and reach the tray portion 91 through the hole 95 only after having hit the droplet landing surface 93. The droplet landing surface 93, the central cover portion 94, the surrounding hole 95, and the connecting members 96 are more clearly shown in FIG. 3.

An important feature of the droplet landing surface 93 is that it has a convex shape. This shape prevents a coffee droplet landing on the droplet landing surface 93 from being shattered into smaller droplets, which will spatter off the droplet landing surface 93. As a result, there is no risk of the coffee maker 1 getting stained, in particular a top surface of the cover 92 of the drip tray 9 and parts of the coffee maker 1 located in the vicinity of the cover 92. Instead, a coffee droplet landing on the droplet landing surface 93 will break apart and gently flow off the droplet landing surface 93 through the hole 95 into the tray portion 91 of the drip tray 9. A coffee droplet heading for the droplet landing surface 93 and a coffee droplet flowing along the droplet landing surface 93 in the direction of the hole 95 are diagrammatically shown in FIG. 4, wherein the coffee droplets are indicated by reference numeral 10.

The coffee droplets are collected in the tray portion 91. If a quantity of spilled coffee is already present in the tray portion 91, a coffee droplet entering the tray portion 91 through the hole 95 and breaking the surface of said quantity of coffee will hardly cause any disturbance in this quantity, because the coffee droplet leaves the droplet landing surface 93 at a relatively low speed, and the distance covered by the coffee droplet when falling from the droplet landing surface 93 into the tray portion 91 of the drip tray 9 is relatively small.

Figure 4:
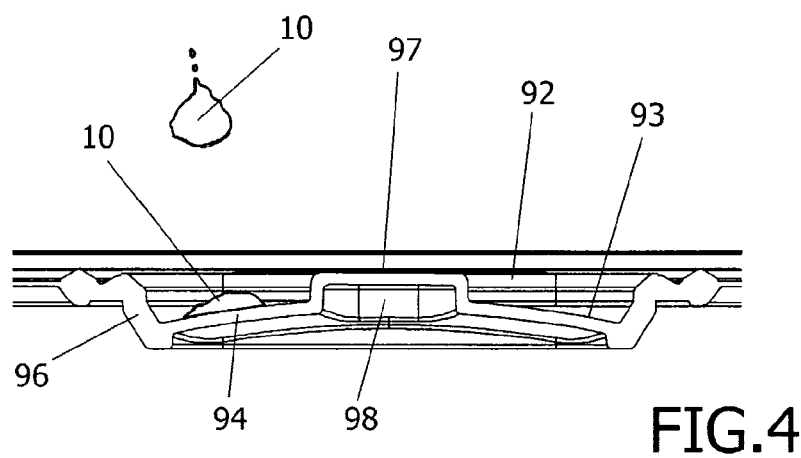
FIG. 4 is a lateral view of a cross-section taken on the line A-A in FIG. 3, wherein two coffee droplets are diagrammatically shown.

It is clear from the appearance of the cross-sections of the central cover portion 94 shown in FIGS. 2 and 4, which are taken in perpendicular directions, that the droplet landing surface 93 is convex in more than one direction. This feature plays a role in the prevention of the formation of small droplets flying off the droplet landing surface 93.

As was noted above, the outlet member 7 of the coffee maker 1 comprises two outlet openings. As a consequence, the coffee droplets land on two areas of the droplet landing surface 93, and a central portion 97 of the top surface of the central cover portion 94, which is located in between these areas, has no function in receiving the coffee droplets. Therefore, this central portion 97 may be given another function. In the example shown, the central portion 97 of the top surface of the central cover portion 94 is planar and at substantially the same level as the top surface of the rest of the cover 92, so that it can serve as a support for a cup or the like. In particular, the central portion 97 of the top surface of the central cover portion 94 is a top surface of an elevated portion 98 of the central cover portion 94, which will hereinafter be referred to as cup rest 98.

Figure 5:
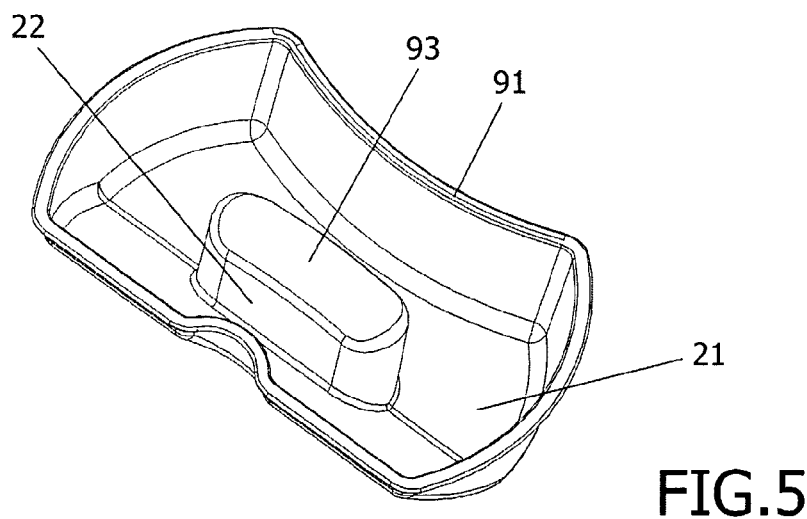
FIG. 5 is a perspective top view of a tray portion of a drip tray of a coffee maker according to a second preferred embodiment of the present invention.

The droplet landing surface 93 may be integrated in the cover 92 of the drip tray 9, as is the case in the embodiment illustrated by FIGS. 1-4. Within the scope of the present invention, this is not the only feasible location of the droplet landing surface 93 in the drip tray 9. Another possibility is illustrated by FIG. 5. This Figure only shows a tray portion 91 of a drip tray 9. A portion of a bottom 21 of the tray portion 91 is elevated, so that a dome 22 is formed. In this configuration, a top surface of the dome 22 serves as the droplet landing surface 93. FIG. 5 shows that the droplet landing surface 93 also has a convex shape in this example, wherein the droplet landing surface 93 is convex in more than one direction.

The level of the droplet landing surface 93 with respect to the bottom of the tray portion 91 is chosen such that it is ensured that the droplet landing surface 93 never gets covered by coffee contained by the tray portion 91. If the level of the droplet landing surface 93 were lower, the droplet landing surface 93 would lose its function as soon as the level of the coffee inside the tray portion 91 gets higher.

Figure 3:
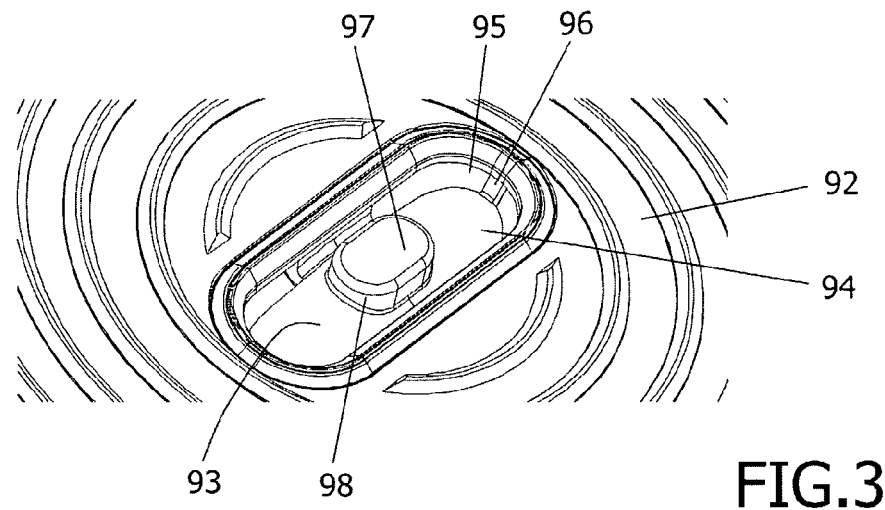
FIG. 3 is a perspective top view of a portion of a cover which forms part of the foot of the coffee maker shown in FIG. 1.

The droplet landing surface 93 as shown in FIG. 5, which is integrated in the tray portion 91 of the drip tray 9, functions in the same manner as the droplet landing surface as shown in FIGS. 2-4, which is integrated in the cover 92 of the drip tray 9. The coffee droplets which land on the droplet landing surface 93 break apart and gently flow off the droplet landing surface 93. The coffee droplets keep flowing along a surface of the dome 22 until they reach the bottom 21 of the tray portion 91 or, if the tray portion 91 already contains a quantity of coffee, until they reach a surface of the quantity of coffee. This prevents the coffee droplets from dropping directly on the bottom 21 of the tray portion 91 or the surface of a quantity of coffee, so that there is no risk of coffee droplets splashing out of the tray portion 91.

The tray portion 91 having the dome 22 may be part of a coffee maker that is similar to the coffee maker 1 shown in FIG. 1, apart from the design of the drip tray 9. FIG. 5 shows that the dome 22 has an elongated shape. Consequently, the droplet landing surface 93 is suitable for receiving coffee droplets falling from two outlet openings in an outlet member 7 of the coffee maker of which the tray portion 91 is part. If the outlet member 7 of the coffee maker comprises only one outlet opening, the droplet landing surface 93 may be smaller.

If the drip tray 9 comprising the tray portion 91 as shown in FIG. 5 also comprises a cover 92, this cover 92 may be provided with holes for allowing coffee droplets to move directly to the droplet landing surface 93.

The use of a droplet landing surface 93 in the drip tray 9 for receiving coffee droplets falling from the outlet member 7 of the coffee maker 1 has important advantages. One of these advantages has already been mentioned above. The presence of the droplet landing surface 93 prevents the coffee droplets from falling directly on the bottom 21 of the tray portion 91 of the drip tray 9 or, if the bottom 21 of the tray portion 91 of the drip tray 9 is already covered by a quantity of coffee, on a surface of this quantity of coffee. Consequently, a situation in which coffee splashes out of the drip tray 9 and stains the cover 92 of the drip tray 9 and/or nearby parts of the coffee maker 1 does not occur. In this way, the droplet landing surface 93 contributes to the cleanliness of the coffee maker 1.

If the droplet landing surface 93 is integrated in the cover 92 of the drip tray 9, the hole 95 in the cover 92 for letting through the coffee droplets to the tray portion 91 of the drip tray 9 may be relatively small. In covers 92 which need to have holes in order not to be a hindrance for coffee droplets falling from the outlet member 7 of the coffee maker 1, the holes need to be much bigger to ensure that areas where the coffee droplets may pass are left clear. The fact that the hole 95 in the cover 92 comprising the droplet landing surface 93 may be small results in a much cleaner design of the coffee maker 1, in which a user is not confronted with the sight of dark holes which are relatively large. In fact, the narrow annular hole 95 is not even perceived as a hole.

It will be clear to those skilled in the art that the scope of the present invention is not limited to the examples discussed above, but that several amendments and modifications thereof are possible without deviating from the scope of the present invention as defined in the attached claims.

The examples discussed show a coffee maker. It will be clear that the invention is not limited to coffee makers and that the invention can also be used in devices for making other beverages.

The drip tray 9 according to the present invention, which comprises the droplet landing surface 93, may be part of a coffee maker having a construction different from the coffee maker 1 shown in FIG. 1. The shape of the drip tray 9 may be chosen freely. As far as the position of the drip tray 9 in the coffee maker is concerned, it is important that the position of the drip tray 9 is such that the drip tray 9 is capable of actually receiving coffee flowing over the cup(s) placed in the coffee maker or coffee flowing or dripping from the outlet opening(s) in the outlet member 7 of the coffee maker.

The number of outlet openings of the outlet member 7 of the coffee maker 1 is not essential. The outlet member 7 may comprise two outlet openings, as is the case in the disclosed examples, but may alternatively comprise one outlet opening, or even more than two outlet openings. In any case, according to the invention, the droplet landing surface 93 is arranged for receiving droplets from all available outlet openings. It is possible that the droplet landing surface 93 is not a continuous whole, but is divided into several pieces instead, located in suitable positions.

If the droplet landing surface 93 is integrated in the cover 92 of the drip tray 9, it is not necessary to have at least one cup rest 98 having a planar top surface 97.

The shape of the droplet landing surface 93 does not necessarily need to be convex. The droplet landing surface 93 may equally well be concave, or at least comprise concave portions. For example, if the droplet landing surface 93 is integrated in the cover 92 of the drip tray 9 and has a concave shape, wherein a lowest point of the droplet landing surface 93 is in the center of the droplet landing surface 93, the hole 95 will be arranged in said center, so that all received coffee droplets are directed towards the hole 95. If a cup rest 98 is provided in a central position, there may be an annular hole 95 around the cup rest 98, the cup rest 98 being connected to the rest of the cover 92 by means of connecting members. In another feasible embodiment, in which the droplet landing surface 93 is integrated in the cover 92 of the drip tray 9, and in which the droplet landing surface 93 is suitable for receiving coffee droplets falling from two outlet openings in the outlet member 7 of the coffee maker 1, the droplet landing surface 93 may comprise two concave areas having a hole 95 in the center. In all possible embodiments of the droplet landing surface 93, it is important that a shape of the droplet landing surface 93 deviates from a shape of a surface extending in a substantially horizontal plane, so that it is ensured that a situation in which coffee droplets landing on the droplet landing surface 93 start to flow along the droplet landing surface 93 is obtained, while a situation in which the coffee droplets bounce off the droplet landing surface 93 is avoided.

According to the present invention, a droplet landing surface 93 is provided, which is situated in a path between an outlet opening of the outlet member 9 and the bottom 21 of the tray portion 91. Due to the presence of such a droplet landing surface 93, coffee droplets dropping towards the bottom 21 of the tray portion 91 are stopped before they reach the bottom 21, after which they are conducted along the droplet landing surface 93 until being released from the droplet landing surface 93 and gently descending towards the bottom 21 of the tray portion 91. In fact, the path of the coffee droplets on their way towards the bottom 21 of the tray portion 91 is temporarily interrupted. An important advantage of this is that the droplets fall on the bottom 21 of the tray portion 91 or, if the tray portion 91 already contains a quantity of coffee, on the surface of the quantity of coffee at a reduced speed. Moreover, if the drip tray 9 comprises a cover 92, the hole(s) 95 in the cover 92 for letting through the droplets to the tray portion 91 may be chosen to be relatively small because the droplets are received by the droplet landing surface 93 and conducted in a desired direction.

In the foregoing, a coffee maker 1 with a drip tray 9 for is disclosed. The drip tray 9 serves for receiving coffee droplets falling from an outlet member 7 of the coffee maker 1 when a path between the outlet member 7 and the drip tray 9 is free from interruptions such as a coffee cup. The drip tray 9 comprises a tray portion 91 and a cover 92 in which a convex droplet landing surface 93 for receiving droplets falling from the outlet member 7 of the coffee maker 1 is arranged. A coffee droplet falling on the droplet landing surface 93 breaks apart, gently flows off the droplet landing surface 93, and is discharged to the tray portion 91 through a narrow hole 95 arranged in the cover 92. In this way, a situation in which coffee splashes out of the tray portion 91 as a result of the direct impact of a coffee droplet is avoided, and the cleanliness of the coffee maker 1 is enhanced.

The invention claimed is:

1. Beverage supplying device comprising a beverage outlet member and a drip tray, the drip tray comprising a cover for closing off a top side of the drip tray, the cover including a droplet landing surface for receiving droplets of beverage issuing from the beverage outlet member, which droplet landing surface is located at a height that is higher than a bottom of the drip tray, wherein the cover includes an annular hole surrounding the droplet landing surface for letting through droplets of beverage, and wherein the hole is only interrupted by at least one connecting member for connecting the droplet landing surface to the cover.

2. Beverage supplying device according to claim 1, wherein a shape of the droplet landing surface deviates from a shape of a surface extending in a substantially horizontal plane.

3. Beverage supplying device according to claim 1, wherein the droplet landing surface has a convex shape.

4. Beverage supplying device according to claim 1, wherein the droplet landing surface is shaped as at least a portion of a top surface of a cover portion.

5. Beverage supplying device according to claim 1, wherein the droplet landing surface is recessed with respect to a top surface of a surrounding portion of the cover, and wherein at least one cup rest is arranged on the cover portion of which the droplet landing surface is part, which cup rest has a planar top surface located substantially at the same level as the top surface of the surrounding portion of the cover.

6. Beverage supplying device according to claim 5, wherein the beverage outlet member comprises two outlet openings, and wherein the drop tray is provided with one cup rest which is substantially centrally arranged between two areas of the droplet landing surface on the cover portion of which the droplet landing surface is part.

7. Beverage supplying device according to claim 1, wherein the droplet landing surface is shaped as a top surface of an elevated portion of the bottom of the drip tray.

8. Drip tray for use in a beverage supplying device as claimed in claim 1.

9. Drip tray for a beverage supplying device, comprising a cover for closing off a top side of the drip tray, the cover including a droplet landing surface for receiving droplets of beverage issuing from an outlet member of the beverage supplying device, which droplet landing surface is located at a height that is higher than a bottom of the drip tray, wherein the cover includes an annular hole surrounding the droplet landing surface for letting through droplets of beverage, and wherein the hole is only interrupted by at least one connecting member for connecting the droplet landing surface to the cover.

* * * * *